United States Patent Office 3,152,192
Patented Oct. 6, 1964

3,152,192
PROCESS FOR PREPARING TRIALKYL-1,1-DIMETHYLINDANS
Thomas F. Wood, Wayne, and John Angiolini, Clifton, N.J., assignors to The Givaudan Corporation, New York, N.Y., a corporation of New Jersey
No Drawing. Filed May 2, 1961, Ser. No. 107,023
5 Claims. (Cl. 260—668)

This invention relates to trialkyl-1,1-dimethylindans and to a method for preparing them. More specifically, the present invention relates to the condensation of hereinafter-specified trialkyl-substituted benzenes with 2-methyl-1,3-butadiene (isoprene) or with 2,3-dimethyl-1,3-butadiene, in the presence of acidic condensing agents to produce trialkyl-1,1-dimethylindans or the corresponding trialkyl-1,1,2-trimethylindans.

An object of this invention is to produce novel trialkyl-1,1-dimethylindans and trialkyl-1,1,2-trimethylindans. Another object is to produce these novel materials by a simple, convenient and inexpensive process readily adaptable to commercial usage. Other objects will become apparent from the following description.

The products of this invention and the process for their preparation may be shown by the following reaction:

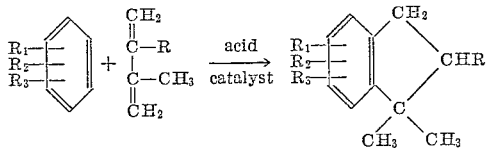

where R is H or $CH_3$ and $R_1$, $R_2$ and $R_3$ are lower alkyl radicals containing up to 5 carbon atoms. $R_1$, $R_2$ and $R_3$ may be the same or different alkyl radicals.

Advantageously, the reaction is conveniently carried out by the slow addition of the "-diene" or a solution of the "-diene" in an inert solvent or in the trialkylbenzene to a cold, rapidly-stirred (—10 to 10° C.) suspension of the trialkylbenzene in aqueous concentrated sulfuric acid (93%). The reaction temperature is maintained at —10 to 10° C. during the addition which usually requires from 2 to 3 hours depending on the efficiency of the cooling. After addition is completed, the mixture is stirred a short time and quenched, or the acid separated. After being washed neutral the solution is vacuum-distilled to yield the indan. An alternate mode of operation is to feed a solution of the "-diene" and all of the trialkylbenzene slowly into the cold sulfuric acid.

It is an advantage of this process that it may be operated at low temperature under atmospheric pressure. The preferred reaction temperatures are considerably lower than the boiling point of isoprene and this reduces the hazard of fire and explosion. Furthermore, apparatus suitable for carrying out reactions under atmospheric pressure is considerably cheaper and simpler in construction and design than that required for pressure reactions.

Trialkylbenzenes which may be used in accordance with this invention are those having at least two unsubstituted adjacent carbon atoms in the aromatic ring as shown by the following general formulae:

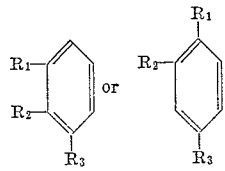

Among trialkylbenzenes which have been successfully condensed in accordance with this invention are pseudocumene (1,2,4-trimethyl-benzene), 1,2,4-triethylbenzene, 1,2,4-triisopropylbenzene, 1,4-dimethyl-2-isopropylbenzene (isopropyl para xylene), 1,3-dimethyl-2-(or 4-) isopropylbenzenes (isopropyl meta xylenes), and 1,2-dimethyl-3-(or 4-)-isopropylbenzenes (isopropyl ortho benzenes).

While aqueous sulfuric acid of about 93% concentration gives advantageous results, sulfuric acid of other concentrations, as well as other condensing catalysts, may be used in accordance with the present invention. Thus, sulfuric acid within the range from about 75% to about 96% strength has been found to give desirable results. The 93% strength sulfuric acid is preferred because it is commercially available, gives excellent yields with a minimum of by-products, and has a low freezing point much below the temperature of the reaction.

Other acids which may be used as condensing catalysts herein are those acids which are capable of acting as Friedel-Crafts condensing catalysts. Examples of such acids are phosphoric acid, polyphosphoric acid, boron trifluoride-water complex and hydrofluoric acid.

In carrying out the process of this invention the proportions of the ingredients may be varied over wide limits. It is preferred to use at least 1 mol and advantageously 2 to 10 mols of the trialkylbenzene per mol of diolefin in order to minimize side reactions, such as polymerization of the diolefin. The acid catalysts may be employed in amounts varying from about 5 to about 100%, by weight, based on the trialkylbenzene employed.

The temperature at which the process of this invention is carried out may also be varied over wide limits, i.e., from about —30° C. to about 150° C. When sulfuric acid is employed, the temperature may advantageously be from about —30° C. to about 80° C. In general, the higher the acid strength the lower the temperature to be used. Thus, when sulfuric acid of about 75%–80% strength is used, a temperature above 50° C., preferably about 60° C. to 80° C. is desirable. When sulfuric acid of about 80% to 90% concentration is used, a temperature within the range from about 5° C. to about 50° C. is suitable. With sulfuric acid of 90%–95% strength, a temperature from about —30° C. to about 15° C., preferably from about —10° C. to 10° C., is desirable.

When milder condensing acids, such as phosphoric and polyphosphoric acids, are used, higher reaction temperatures, such as about 105° C. to 150° C., are suitable. Anhydrous HF is active at about the same temperatures as 93% sulfuric acid, namely, —30° to 50° C. The $BF_3 \cdot H_2O$ catalyst is quite active at 25° to 35° C.

The indans formed by the process (and examples) of this invention are suitable for use as chemical intermediates, intermediates for odorants, including musk odorants, low cost aromatic solvents, diesel fuel additives, and as intermediates for the preparation of saturated bicyclic hydrindans with the desirable characteristics required in jet fuels. These saturated hydrindans may be prepared by hydrogenating the indans formed by the present process as elevated temperatures, e.g., 200° C. or higher, in the presence of Raney nickel as catalyst.

In a recent patent (U.S. 2,916,529 to Sinclair Refining Company) it is stated that "the production of indan and its homologues has commercial interest in that indans are useful as intermediates in the production of the unsaturated indenes which are in turn of value since they are readily polymerized to yield valuable resins." It is thus apparent that the process of this invention may have significant commercial interest in the field of synthetic resins.

The invention is further illustrated by the following examples, without however, limiting it to them. The temperatures given in the specification are in degrees centigrade, unless otherwise stated.

EXAMPLE I

1,1,4,6,7-Pentamethylindan

Into a vigorously-agitated suspension of 185 g. of 93% sulfuric acid and 400 g. of 1,2,4-trimethylbenzene (pseudocumene) chilled to −5° C., there was added dropwise over a 4½ hour period a solution of 68 g. isoprene (1 mole) and 118 g. of 1,2,4-trimethylbenzene keeping the temperature at −6 to 0° C. After stirring 40 minutes longer after the addition, the mixture was allowed to settle. The lower sulfuric acid layer was separated (212 g.). The remaining oil layer was washed successively with water (200 ml.), 5% aqueous caustic soda solution (200 ml.), and 5% aqueous sodium bicarbonate solution (200 ml.). The excess 1,2,4-trimethylbenzene was distilled off under reduced pressure (323 g. recovered) and the residual liquid was subjected to high vacuum distillation to yield 132 g. of the desired condensation product, B.P. 87–90° C. (1 mm.), which rapidly solidified. Recrystallization from 300 g. of ethyl alcohol yielded 102 g. of 1,1,4,7-pentamethylindan, M.P. 75–76° C. The infrared absorption spectrum of this hydrocarbon shows a band at 7.62 microns which is characteristic for the indan structure.

*Analysis.*—Calcd. for $C_{14}H_{20}$: C, 89.3; H, 10.72. Found: C, 89.05; H, 10.57.

The acetyl derivative, 1,1,4,6,7-pentamethyl-5-acetylindan, prepared by the method described in U.S. Patent No. 2,897,237, M.P. 64–65° C. was obtained as a colorless solid having an animal type, musty and musk-like odor, suitable for use in perfumery as a fixative.

*Analysis.*—Calcd. for $C_{16}H_{22}O$: C, 83.47; H, 9.56. Found: C, 83.44; H, 9.27.

EXAMPLE II

1,1-Dimethyl-4-(5-),6,7-Triethylindan

Into a vigorously agitated suspension of 185 g. of 93% sulfuric acid and 540 g. of tech. triethylbenzene chilled to −5° C. was added dropwise over a 5½ hour period a solution of 68 g. of isoprene (1 mole) in 168 g. tech. triethylbenzene, keeping the temperature at −7 to −2° C. Stirring was continued for 40 minutes after the feed. The mixture was settled and the sulfuric acid removed (207 g. recovered). The remaining oil was washed successively with water (200 ml.), 5% aqueous caustic soda solution (200 ml.) and 5% aqueous bicarbonate of soda solution (200 ml.). The excess triethylbenzene was distilled off (480 g. recovered) and the residual liquid was vacuum distilled at 1 mm. The desired hydrocarbon product was obtained as a colorless liquid, B.P. 103–112° C. (1 mm.), $n_D^{20}$ 1.5104–1.5205, and amounted to 116 g.

The infrared absorption spectrum of the hydrocarbon showed a band at 5.70μ indicating pentasubstitution on the benzene ring and a band at 7.62μ which is characteristic of indans.

It can be used as an intermediate for the preparation of fuel for jet engines since catalytic hydrogenation yields a hydrindan derivative. Compounds of this nature are known to have excellent properties for jet fuels.

Of the two structures indicated the 1,1-dimethyl-4,6,7-triethylindan is the most probable.

The acetyl derivative was obtained as a viscous, colorless liquid, B.P. 139–140° C. (2 mm.), $n_D^{20}$ 1.5256–1.5293, having a mild odor.

*Analysis of acetyl derivative.*—Calcd. for $C_{19}H_{28}O$: C, 83.78; H, 10.36. Found: C, 83.46; H, 10.12.

EXAMPLE III

1,1-Dimethyl-4,5,7-Triisopropylindan and Isomers

Into a rapidly stirred suspension of 40 g. of 93% sulfuric acid and 612 g. of commercial grade triisopropylbenzene (Dow Chem. Co.), cooled to −5°, there was slowly fed in, dropwise, over a 3½ hour period, a solution of 68 g. of isoprene in 204 g. of triisopropylbenzene while the temperature was maintained at −5 to 0°. The reaction mixture was stirred for an additional 40 minutes after the feed. The mixture was then allowed to settle and the resulting sulfuric acid layer was removed (450 g.). The remaining oil layer was washed successively with water (200 ml.), 5% sodium hydroxide solution (150 ml.), and 5% sodium bicarbonate solution (200 ml.). Upon vacuum distillation there was first obtained 666 g. of recovered triisopropylbenzene plus an intermediate fraction, B.P. 75–110° (0.8 mm.), $n_D^{20}$ 1.4899–1.5071, and then the desired product, a colorless material, B.P. 110–118° (0.8 mm.) amounting to 78 g. which rapidly solidified on standing. After recrystallization from an equal weight of ethyl alcohol the product melted at 79.5–81°.

In the infrared absorption spectrum there was observed the band at 7.6μ which is characteristic of indan derivatives. Upon catalytic hydrogenation of this hydrocarbon there is produced an hydrindan derivative which exhibits properties desired in a fuel for jet engines.

Also the hydrocarbon can be acetylated, nitrated, chloromethylated etc. to produce intermediates of interest to the pharmaceutical industry.

Acetylation of the above hydrocarbon mixture yielded a solid derivative, B.P. 128–130° (2 mm.) which crystallized after distillation. After recrystallization from an equal weight of ethyl alcohol the product melted at 56–58°.

EXAMPLE IV

1,1,4,7-Tetramethyl-5-(6-)Isopropylindan

Into a solution of 750 ml. of para xylene (634 g.) and 200 ml. of isopropyl alcohol (155 g.) (2.58 moles), which was cooled to 15° and rapidly stirred, was added dropwise a solution of 1,000 ml. of 96% sulfuric acid in 220 ml. of water over a 3 hr. period during which time the temperature was maintained at 15 to 20° C. Then the mixture was stirred for 24 hrs. at 33–35°. After the reaction mixture was settled and the acid layer was removed, the oil layer was washed successively with water (200 ml.), 5% sodium hydroxide solution (100 ml.) and 5% sodium bicarbonate solution (200 ml.). The solution was filtered through infusorial earth and distilled. The excess para xylene was recovered as a fraction, B.P. 37–42° (16 mm.). After a small intermediate fraction (42–85° C./16 mm.) the mono isopropyl p-xylene was obtained as a colorless liquid, B.P. 85° (16 mm.), $n_D^{20}$ 1.5005–15, amounting to 285 g. The vapor-phase chromatogram of the product showed a single product. The infrared curve showed absorption bands at 5.33, 5.50, 5.70 (weak) and 12.41μ (strong) characteristic of 1,2,4-trisubstitution on the benzene ring.

The product, 1,4-dimethyl-2-isopropylbenzene, was condensed with isoprene as follows:

Into a rapidly stirred suspension of 196 g. of 93% sulfuric acid, and 444 g. of the hydrocarbon, chilled to −5°, there was added dropwise over a 3½ hour period a solution of 68 g. of isoprene in the hydrocarbon (148 g.) while the temperature was maintained at −5 to 0° throughout. Stirring was continued 40 minutes after the feed. After settling and removal of the acid layer (rec. 206 g.) the oil was washed successively with water (250 ml.), 5% sodium hydroxide (125 ml.), and 5% sodium bicarbonate solution (250 ml.), filtered and distilled. There was recovered 390 g. of the starting hydrocarbon (B.P. 46°/1.5 mm., $n_D^{20}$ 1.5015) followed by 3 g. of intermediate and 184 g. (85.3% of theory) of the desired condensation product, B.P. 103–105° (1 mm.), $n_D^{20}$ 1.5232, and 9 g. of residue. Vapor-phase chromatograms of the product showed a single isomer. The infrared absorption indicated an indan structure and a penta-substituted benzene ring. This hydrocarbon is a suitable intermediate for the preparation of jet fuel.

It is thought that the most probable structure of this hydrocarbon is 1,1,4,7-tetramethyl-6-isopropylindan. The I.R. band at 5.70 microns shows a penta-substituted benzene ring. The I.R. band at 7.62 microns shows indan structure. The hydrocarbon has a molecular weight of 216, specific gravity (25°/25° C.) of 0.9265 and analyzed as follows:

Calcd. for $C_{16}H_{24}$: C, 88.76; H, 11.17. Found: C, 89.07; H, 11.12.

The hydrocarbon is useful as an intermediate for the preparation of jet fuel by hydrogenation to a tetramethyl isopropyl hydrindan having excellent combustion properties.

EXAMPLE V

1,1,4,6-Tetramethyl-5-Isopropylindan and Isomers

Monoisopropyl m-xylene was prepared in 65.5% yield by the condensation of isopropyl alcohol and meta xylene using the procedure described in Example IV for p-xylene. It was obtained as a colorless liquid, B.P. 87–88° (18 mm.), $n_D^{20}$ 1.5027–38. The infrared absorption curve showed the presence of all three possible isomers. There were strong absorption bands at 12.25–30$\mu$ (1,2,4- and 1,3,5-trisubstitution), 13.05 and 13.45$\mu$ (1,2,3-trisubstitution), and 14.23$\mu$ (1,3,5-trisubstitution). The vapor-phase chromatogram indicated three isomers in the product. Therefore, the monoisopropyl m-xylene is a mixture of the 3 isomers, 1,3-dimethyl-2-isopropylbenzene, 1,3-dimethyl-4-isopropylbenzene, and 1,3-dimethyl-5-isopropylbenzene.

Condensation of this mixture of isomers with isoprene was readily effected by the procedure described in the preceding example. The desired condensation product was obtained in a yield of 54.6% of theory as a mixture of isomers, B.P. 98–101° (1.2 mm.), $n_D^{20}$ 1.5220–46. Examination of the product by infrared analysis showed a predominance of the indan structure. Vapor-phase chromatography showed 2 principal isomers, one amounting to 68.9%, the other 23.5% and two others in small amount. This hydrocarbon product is suitable as an intermediate for the preparation of jet fuel, by hydrogenation to give a mixture of hexahydroindan derivatives.

The hydrocarbon has a molecular weight of 216, specific gravity (25°/25° C.) of 0.9255 and, yields, on carbon-hydrogen analysis:

Calcd. for $C_{16}H_{24}$: C, 88.76; H, 11.17. Found: C, 88.89; H, 11.11.

EXAMPLE VI

1,1,5,6-Tetramethyl-7-Isopropylindan and Isomers

Monoisopropyl o-xylene was prepared by the condensation of isopropyl alcohol with ortho xylene using the same procedure as was used with p-xylene in Example IV. The desired monoisopropyl o-xylene was obtained in a yield of 76.4% of theory; it was a colorless liquid, B.P. 90–91° (17.5 mm.), $n_D^{20}$ 1.5035–56. The vapor-phase chromatogram showed the presence of the two isomers, 1,2-dimethyl-3-isopropylbenzene and 1,2-dimethyl-4-isopropylbenzene. Infrared analysis showed vicinal and unsymmetrical trisubstitution on the benzene ring which is in harmony with the above two structures.

Condensation of the above product with isoprene was readily effected with cold 93% sulfuric acid by the procedure of Example IV. The desired condensation product was obtained in a yield of 84.2% of theory calculated on the isoprene used. The product was colorless liquid, B.P. 99–104° (1.2 mm.), $n_D^{20}$ 1.5143–1.5228. Infrared analysis indicated the product to be mainly of indan structure. The vapor-phase chromatogram showed 3 isomers present in about a 50–40–10 ratio. This hydrocarbon mixture is suitable as an intermediate for the preparation of fuel for jet engines, by hydrogenation to give a mixture of hexahydroindan derivatives having desirable combustion properties.

The hydrocarbon has a molecular weight of 216, specific gravity (25°/25°) of 0.9238, and yields, on carbon-hydrogen analysis:

Calcd. for $C_{16}H_{24}$: C, 88.76; H, 11.17. Found: C, 88.75; H, 11.21.

The hydrocarbon has an I.R. band at 5.78 microns, showing mainly the 1,2,3,4,5-pentasubstituted benzene ring; and an I.R. band at 7.61 microns, showing the indan structure.

The foregoing illustrates the invention, which, however, is not to be limited thereby, but is to be construed as broadly as permissible in view of the prior art and limited solely by the appended claims. It is understood that the recitation herein of a formula for the novel compounds is intended to include a mixture containing isomers of the named compounds, wherein the context so admits or requires.

We claim:

1. The process for preparing compounds which may be represented as follows:

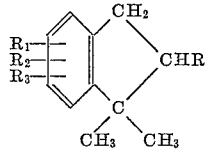

wherein R is a member selected from H and $CH_3$ and each $R_1$, $R_2$ and $R_3$ is a member selected from alkyl radicals containing up to 5 carbon atoms, which comprises reacting a trialkylbenzene having at least two unsubstituted adjacent carbon atoms and the formula:

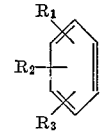

wherein $R_1$, $R_2$ and $R_3$ have the same significance as above, with a member selected from the group consisting of isoprene and 2,3-dimethyl-1,3-butadiene, in the presence of a member selected from the group consisting of sulfuric acid, phosphoric acid, polyphosphoric acid, boron trifluoride-water complex and hydrofluoric acid, at a temperature within the range from about −30° C. to about 150° C.

2. The process of claim 1, wherein isoprene is employed.

3. The process of claim 1, wherein said catalyst is aqueous sulfuric acid of about 75 to about 96% concentration and said temperature is within the range from about −30° C. to about 80° C.

4. The process of claim 1, wherein the catalyst is sulfuric acid of about 93% concentration and the temperature is within the range from about −10° C. to about 10° C.

5. The process of claim 2, wherein 1,2,4-trialkylbenzene is the trialkylbenzene employed.

References Cited in the file of this patent

UNITED STATES PATENTS 2,904,607     Mattox et al. _____ Sept. 15, 1959

OTHER REFERENCES

Chemical Abstracts, vol. 53, pages 10144–5 (1959).
Chemical Abstracts, vol. 41, pages 4477 (1947).
Chemical Abstracts, vol. 46, page 5022 (1952).
Chemical Abstracts, vol. 54, page 5516 (1960) and vol. 54 index, p. 852.

UNITED STATES PATENT OFFICE
CERTIFICATE OF CORRECTION

Patent No. 3,152,192                                                   October 6, 1964

Thomas F. Wood et al.

It is hereby certified that error appears in the above numbered patent requiring correction and that the said Letters Patent should read as corrected below.

Column 2, line 4, for "(isopropyl ortho benzenes)" read -- (isopropyl ortho xylenes) --; column 3, line 21, for "1,1,4,7-" read -- 1,1,4,6,7- --; same column 3, line 71, for "40 g." read -- 400 g. --.

Signed and sealed thid 9th day of February 1965.

(SEAL)
Attest:

ERNEST W. SWIDER                                                       EDWARD J. BRENNER
Attesting Officer                                                            Commissioner of Patents